United States Patent [19]

Scholtus et al.

[11] 4,103,816

[45] Aug. 1, 1978

[54] METHOD AND DEVICE FOR WELDING CYLINDRICAL ELEMENTS TO ONE ANOTHER

[75] Inventors: Christiaan Gustaaf Adolf Scholtus, Oudorp; Eduard Lijbrink, Bergen; Franciscus Alexander Theodorus Meijer, Egmond a d Hoef; Antonius Ruiter, Schagen, all of Netherlands

[73] Assignee: Ultra Centrifuge Nederland N.V., The Hague, Netherlands

[21] Appl. No.: 625,474

[22] Filed: Oct. 24, 1975

[30] Foreign Application Priority Data

Oct. 25, 1974 [NL] Netherlands .................. 7414020

[51] Int. Cl.² ............................................. B23K 37/04
[52] U.S. Cl. ............................................. 228/49; 228/50; 279/2 A; 279/4
[58] Field of Search ............... 228/212, 216, 50, 49, 228/44.5, 46; 29/200 P, 200 J; 269/22; 279/2 A, 4

[56] References Cited

U.S. PATENT DOCUMENTS

| 2,615,414 | 10/1952 | Adams et al. | 269/22 |
| 2,792,626 | 5/1957 | Chyle | 228/50 X |
| 3,079,789 | 3/1963 | Dean | 279/4 X |
| 3,194,466 | 7/1965 | Davis | 228/44.5 X |
| 3,270,411 | 9/1966 | Thomas | 228/44.5 X |
| 3,388,916 | 6/1968 | Winnen et al. | 279/4 X |
| 3,507,507 | 4/1970 | Tobler et al. | 279/2 A |
| 3,571,908 | 3/1971 | Pilia | 228/50 X |

Primary Examiner—Donald G. Kelly
Assistant Examiner—K. J. Ramsey
Attorney, Agent, or Firm—Birch, Stewart, Kolasch and Birch

[57] ABSTRACT

This invention relates to a device for welding cylindrical elements headwise to one another, whereby the welding is achieved by subjecting the cylindrical parts during the welding operation to a radial pressure near the welding area, which radial pressure may be directed inwardly or outwardly, whereas the device employed comprises an elastic ring to be arranged around the parts to be welded, said ring being accommodated in a sleeve in which a conduit for the supply of pressurized medium to the space between the ring and the sleeve is arranged.

7 Claims, 2 Drawing Figures

METHOD AND DEVICE FOR WELDING CYLINDRICAL ELEMENTS TO ONE ANOTHER

BACKGROUND OF THE INVENTION

The invention relates to a method and a device for welding cylindrical elements headwise to one another. In welding cylindrical elements to one another care has to be taken for the parts to be welded to accurately engage one another with aligned heads. It may also occur that the elements do not exhibit the desired circumferential shape, for example, a circular circumference, and during the welding process this has to be corrected. After welding the continuity of the resulting cylindrical wall should be disturbed as little as possible, while the axes of the welded elements should coincide as accurately as possible.

SUMMARY OF THE INVENTION

The object of the invention is to provide a method and a device which permit of welding cylindrical elements under the above stated conditions.

According to the invention this is achieved by subjecting the cylindrical parts during the welding operation to a radial pressure near the welding area. It is thus ensured that the parts to be welded are accurately aligned, while the heat required for welding can be transferred to either side of the welding area. The radial pressure may be directed inwardly or outwardly. For carrying out the method, in which a radial pressure is exerted on the outer side of the cylindrical elements, a device may be employed which is characterized by an elastic ring to be arranged around the parts to be welded, said ring being accommodated in a sleeve in which a conduit for the supply of pressurized medium to the space between the ring and the sleeve is arranged. When pressurized medium is fed through said conduit to the space between the ring and the sleeve, the diameter of the elastic ring is reduced and the ring will engage the parts to be welded. The pressure thus exerted on the cylindrical parts will obviate any differences in diameter so that the heads of the elements will be accurately aligned. It will be obvious that said method and device are mainly employed for elements having approximately equal diameters. Said ring has to eliminate a change in diameter which is the sum of the clearance required for arranging the device around the parts to be welded as well as the difference in diameter between the cylindrical parts to be welded and the change in diameter required for building up a minimum contact pressure between the device and each of the parts to be welded. Therefore, the change in diameter of the ring has to be so small that the deformation of the ring remains within the yield limit of the material.

In order to obtain a satisfactory weld the heat developed in welding has to be conducted away as much as possible, which is achieved by ensuring a satisfactory contact between the ring and the parts to be welded. In order to avoid welding of the ring in the welding area to the parts to be welded, the ring has, in a preferred embodiment of the invention, a circumferential groove communicating with venting channels. Owing to the heat developed in welding the gases expand in the parts bounded by the circumferential groove and the weld. By the communication with the exhaust channels the expansion of the gases inside said space is kept within safe limits so that the risk of damage of the weld by high pressure is avoided. The ring is arranged in the sleeve with a given amount of clearance by means of head flanges.

For carrying out the method in which the desired radial pressure is exerted on the inner side a device may be employed which is characterized by an elastic ring to be arranged inside the parts to be welded, said ring being accommodated in a sleeve having a duct for the supply of pressurized medium to the space between the ring and the sleeve.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
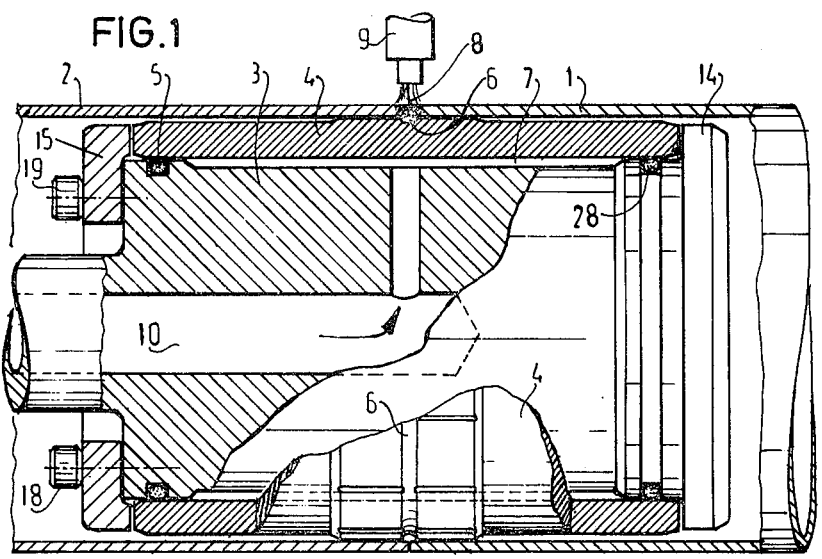
FIG. 1 is an embodiment of a device for exerting a radial pressure on the inner side of the parts to be welded and FIG. 2 is an embodiment in which the radial pressure is exerted on the outer side of the parts to be welded.

In FIG. 1 a cylindrical part 1 in sectional view is shown, the head of which has to be welded to a cylindrical part 2. On the inner side of the parts 1 and 2 a sleeve 3 is arranged, which has a supply conduit 10 for pressurized medium. The outer surface of the sleeve 3 is provided with an elastic circumferential part 4. An annular recess 6 is provided on the outer side of the flexible circumferential part 4. When pressurized medium is fed into the space 7, the flexible circumferential part 4 is moved radially outwards such that it will engage the inner sides of the parts 1 and 2. Viewed in an axial direction the parts 1 and 2 are thus aligned. Owing to the recess 6 no material is present around the welding area 8 so that the parts to be welded cannot be welded to the part 4 by the heat supplied by the welding apparatus 9. It should, however, be avoided that the gases contained in the space 6 should expand due to heating and should thus exert unwanted forces on the parts to be welded. In order to avoid this risk the space 6 communicates with vent channels not shown in FIG. 1. It will be obvious that the material of the element 4 must have adequate elasticity in order to allow for the required expansion. The space 7 is closed by the sealing rings 5 and 28.

Figure 2:
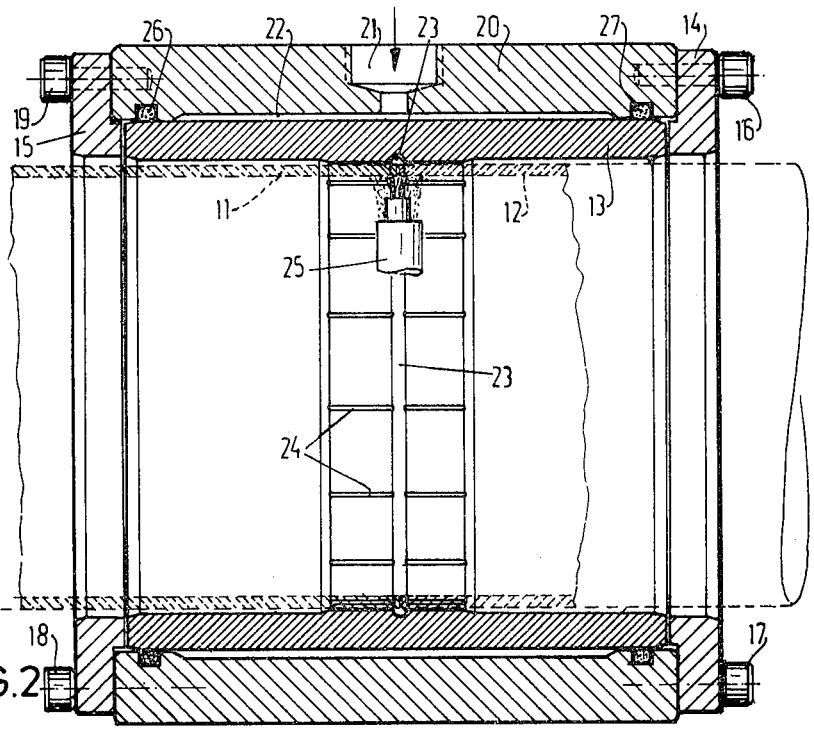

As shown in FIG. 2, the cylindrical parts 11 and 12 to be welded headwise to one another are subjected to a radial pressure from the outside to the interior. For this purpose an elastic ring 13 is employed, which ring, like in the embodiment shown in FIG. 1, is enclosed in a sleeve 20 with the aid of the head flanges 14 and 15 and bolts 16, 17, 18 and 19 with a given amount of clearance. The sleeve 20 holds a supply conduit 21 for pressurized medium so that in the space 22 between the ring 13 and the sleeve 20 such a pressure can be generated that the ring 13 will engage the parts 11 and 12 to be welded.

The ring 13 has a groove 23, which has to be located near the welding area. The groove 23 communicates with the vent channels 24. The welding head 25 is moved on the inner side of the cylindrical parts 11 and 12 towards the welding area. The ring 13 may be made from appropriate elastic material, for example, aluminium. The space 22 is closed by means of circumferential sealing rings 26 and 27 of suitable sealing material. The pressurized medium may be oil, air or water.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A device for welding cylindrical elements which comprises:
   an elastic ring being accommodated in a sleeve such that a space exists laterally between said ring and said sleeve;
   means for introducing a pressurized medium into said space;
   said ring, sleeve and space between said ring and sleeve being specially arranged such that when the pressurized medium is introduced into said space, said ring is displaced laterally so as to engage and align both of the cylindrical elements to be welded by placing radial pressure to said elements near the site of welding; and
   said sleeve being thicker adjacent the center of the sleeve than at its ends, the open surface of the sleeve extending from the ends of the sleeve to the thicker section being recessed, said extended recessed sections comprising at least 50 percent of the sleeve length.

2. A device for welding cylindrical elements which comprises:
   an elastic ring being accommodated in a sleeve such that a space exists laterally between said ring and said sleeve;
   means for introducing a pressurized medium into said space;
   said ring, sleeve and space between said ring and sleeve being specially arranged such that when the pressurized medium is introduced into said space, said ring is displaced laterally so as to engage and align both of the cylindrical elements to be welded by placing radial pressure to said elements near the site of welding; and
   said elastic ring having a circumferential groove at the welding site such that said ring does not contact said cylindrical elements near said welding site, and further including vent channels communicating with said circumferential groove.

3. A device for welding cylindrical elements which comprises an elastic ring, said ring being accommodated in a sleeve such that a space exists laterally between said ring and said sleeve, and means for introducing a pressurized medium into said space, said elastic ring having a circumferential groove at the welding site such that said ring does not contact said cylindrical elements near said welding site and further including vent channels communicating with said circumferential groove.

4. The device as disclosed in claim 1, further characterized in that said elastic ring has a circumferential groove at the welding site such that said ring does not contact said cylindrical elements near said welding site.

5. The device as disclosed in claim 4, further including vent channels communicating with said circumferential groove.

6. The device as disclosed in claim 1, wherein said elastic ring is aluminum.

7. The device as disclosed in claim 1, wherein said ring is arranged in said sleeve by means of head flanges.

* * * * *